US012662839B2

(12) United States Patent
Gaudreau

(10) Patent No.: US 12,662,839 B2
(45) Date of Patent: Jun. 23, 2026

(54) SUPPORT POLE AND OUTDOOR LIGHTING ASSEMBLY COMPRISING THE SAME

(71) Applicant: Michel Gaudreau, Montreal (CA)

(72) Inventor: Michel Gaudreau, Montreal (CA)

(73) Assignee: Zilux Inc., Quebec City (CA)

( * ) Notice: Subject to any disclaimer, the term of this patent is extended or adjusted under 35 U.S.C. 154(b) by 495 days.

(21) Appl. No.: 17/833,980

(22) Filed: Jun. 7, 2022

(65) Prior Publication Data

US 2023/0392405 A1 Dec. 7, 2023

(51) Int. Cl.

| | |
|---|---|
| ***E04H 12/20*** | (2006.01) |
| ***E04H 12/08*** | (2006.01) |
| ***F21S 8/08*** | (2006.01) |
| ***F21W 131/103*** | (2006.01) |

(52) U.S. Cl.

CPC ............. *E04H 12/20* (2013.01); *E04H 12/08* (2013.01); *F21S 8/086* (2013.01); *F21W 2131/103* (2013.01)

(58) Field of Classification Search

CPC .......... E04H 12/20; E04H 12/08; F21S 8/086; F21S 4/20; F21S 8/033; F21S 8/083; F21S 6/005; F21S 4/24; F21W 2131/103; E04F 13/0736

See application file for complete search history.

(56) References Cited

U.S. PATENT DOCUMENTS

| | | | | |
|---|---|---|---|---|
| 1,629,946 A | | 5/1927 | Angel | |
| 1,959,756 A | * | 5/1934 | John | E04H 12/08 219/93 |
| 3,521,047 A | | 7/1970 | Smith | |
| 3,969,849 A | * | 7/1976 | Franklin | F21S 8/086 52/28 |
| 4,248,025 A | * | 2/1981 | Kleine | E04H 12/08 174/45 R |

(Continued)

FOREIGN PATENT DOCUMENTS

| | | |
|---|---|---|
| CN | 208606071 U | 3/2019 |
| CN | 214664047 U | 11/2021 |

(Continued)

*Primary Examiner* — Gisele D Ford
(74) *Attorney, Agent, or Firm* — Dickinson Wright PLLC

(57) ABSTRACT

A vertically-extending support pole, such as for supporting a luminaire in an outdoor lighting assembly, has three or more vertically-extending sidewall panels arranged adjacent to each other to define external lateral surfaces of the support pole, and a plurality of rigid, vertically-extending structural supports. Each sidewall panel has a width and opposite lateral edges extending between vertically spaced-apart upper and lower ends of said sidewall panels. Each of the structural supports has a width that is less than the width of each of the three or more sidewall panels, and each of the structural supports has opposite lateral edges extending between vertically spaced-apart upper and lower ends of the structural supports. Each of the structural supports is disposed between, and interconnects, two of the three or more sidewall panels, and the sidewall panels overlap the structural supports proximate at least the respective lateral edges thereof. The overlapping portions of the sidewall panels and structural supports are secured together only with adhesive.

25 Claims, 9 Drawing Sheets

(56) References Cited

U.S. PATENT DOCUMENTS

| | | | | | |
|---|---|---|---|---|---|
| 6,009,683 | A * | 1/2000 | Grewe | E04C 3/30 | 52/301 |
| 6,060,658 | A | 5/2000 | Yoshida | | |
| 6,094,881 | A * | 8/2000 | Lockwood | E04C 3/46 | 52/844 |
| 6,705,751 | B1 | 3/2004 | Liu | | |
| 7,159,370 | B2 * | 1/2007 | Oliphant | E04C 3/30 | 52/845 |
| 7,628,505 | B2 | 12/2009 | Flaherty | | |
| 11,363,900 | B1 * | 6/2022 | O'Connor | G09F 13/0454 | |
| 11,460,159 | B2 * | 10/2022 | Pereira | F21S 8/08 | |
| 2006/0164833 | A1 * | 7/2006 | Parkyn | F21V 5/04 | 362/240 |
| 2007/0001872 | A1 * | 1/2007 | Ellison | G08G 1/0965 | 340/907 |
| 2007/0008717 | A1 * | 1/2007 | Flaherty | F21S 8/033 | 362/362 |
| 2009/0040750 | A1 * | 2/2009 | Myer | F21S 9/037 | 136/246 |
| 2010/0223882 | A1 * | 9/2010 | Parenti | E04F 19/00 | 52/745.17 |
| 2016/0003432 | A1 | 1/2016 | Sorensen | | |
| 2017/0038036 | A1 * | 2/2017 | Guerrieri | F21S 4/24 | |

FOREIGN PATENT DOCUMENTS

| | | | |
|---|---|---|---|
| CN | 214745359 | U | 11/2021 |
| GB | 1351250 | A | 4/1974 |

* cited by examiner

FIG. 1A
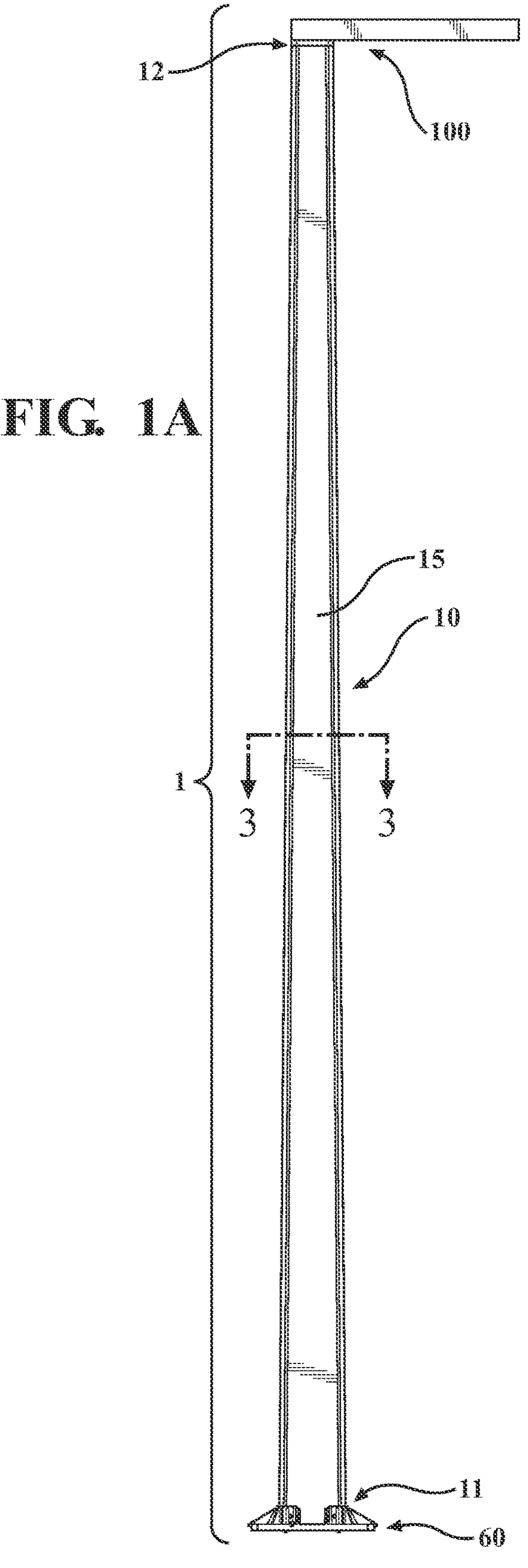
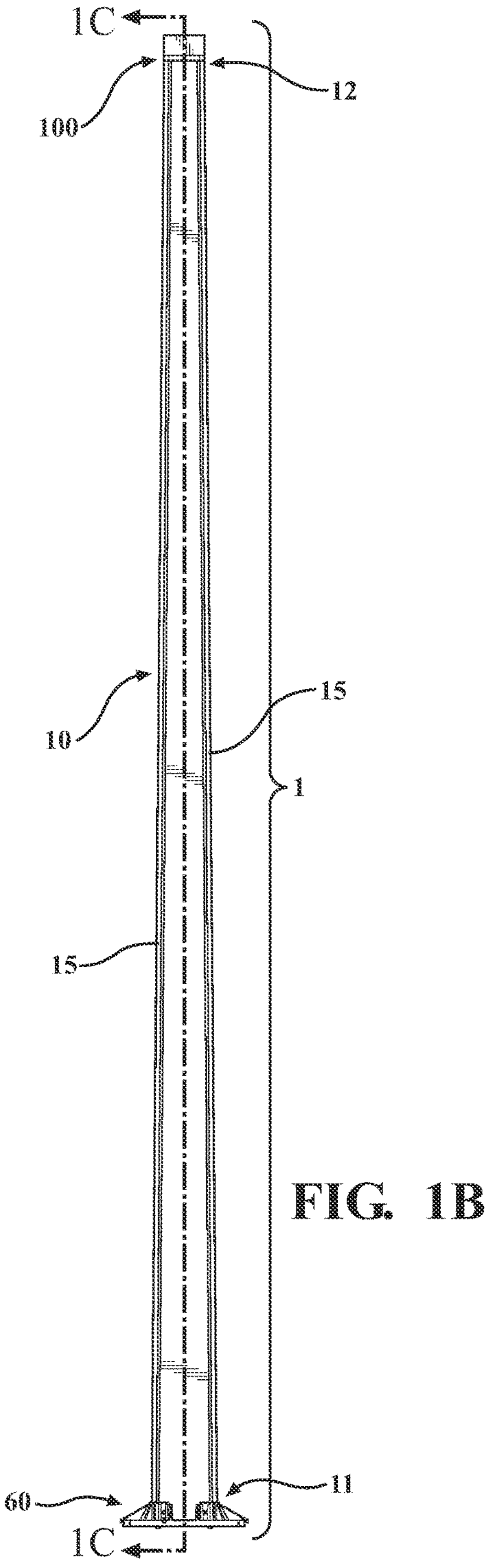
FIG. 1B

SUPPORT POLE AND OUTDOOR LIGHTING ASSEMBLY COMPRISING THE SAME

CROSS-REFERENCE TO RELATED APPLICATIONS

Not applicable.

FIELD OF THE INVENTION

The invention pertains to the fields of support poles and outdoor lighting assemblies comprising such support poles.

BACKGROUND

Support poles, and more particularly support poles for outdoor lighting assemblies, such as overhead lighting for streets, parking lots, walkways, etc., are conventionally monolithic and made of concrete or wood; alternatively, they may be fabricated from metal tubing. While generally suited to their purpose, such poles are not aesthetically suited to all outdoor environments, and they are otherwise open to improvement.

SUMMARY OF THE DISCLOSURE

Disclosed herein is a support pole, as well as an outdoor lighting assembly comprising such a support pole, which is at once attractive, relatively easy to manufacture and assemble, and robust.

The vertically-extending support pole comprises three or more vertically-extending sidewall panels arranged adjacent to each other to define lateral surfaces of the support pole, and a plurality of rigid, vertically-extending structural supports. Each sidewall panel has a width and opposite lateral edges extending between vertically spaced-apart upper and lower ends of said sidewall panels. Each of the structural supports has a width that is less than the width of each of the three or more sidewall panels, and each of the structural supports has opposite lateral edges extending between vertically spaced-apart upper and lower ends of the structural supports. Each of the structural supports is disposed between, and interconnects, two of the three or more sidewall panels. The sidewall panels overlap the structural supports proximate at least the respective lateral edges thereof. The overlapping portions of the sidewall panels and structural supports are secured together only with adhesive.

In one embodiment, the adhesive is a double-sided adhesive tape.

In one embodiment, the support pole comprises four sidewall panels and four structural supports, and the support pole is characterized by a quadrilateral shape in cross-section.

Each sidewall panel may be a metal sheet and may be provided with a decorative exterior surface. In one embodiment, each sidewall panel may be aluminum that is printed with a simulated wood grain appearance.

In one form of the invention, each structural support is a corner extrusion having laterally-extending wings and a vertically-extending, exteriorly-facing channel disposed between the wings. In one form, a LED lighting strip is disposed in the exteriorly-facing channel. The LED lighting strip is selectively operable to generate illumination that is visible from an exterior of the support pole. In one form, a polymer cover overlies each LED lighting strip. The polymer cover may have a decorative exterior surface through which the illumination selectively generated by is LED strip is visible from the exterior of the support pole.

Per another feature, the support pole comprises a base fixedly connected to the support pole at a lower end thereof. In one form, the base is fixedly connected to the lower end of one or more of the structural supports.

An outdoor lighting assembly including the support pole further comprises a luminaire secured to the support pole at an upper end thereof. In one form, the outdoor lighting assembly further comprises a luminaire anchor plate fixedly connected to the upper end of the support pole via one or more of the structural supports. The luminaire is connected to the support pole via luminaire anchor plate. The outdoor lighting assembly may further include any one or more of the aforedescribed features of the pole.

BRIEF DESCRIPTION OF THE DRAWINGS

FIG. 1A is a lateral view of an outdoor lighting assembly according to an exemplary embodiment the present invention;

FIG. 1B is a front view of the outdoor lighting assembly of FIG. 1A;

WRITTEN DESCRIPTION

Figure 1C:
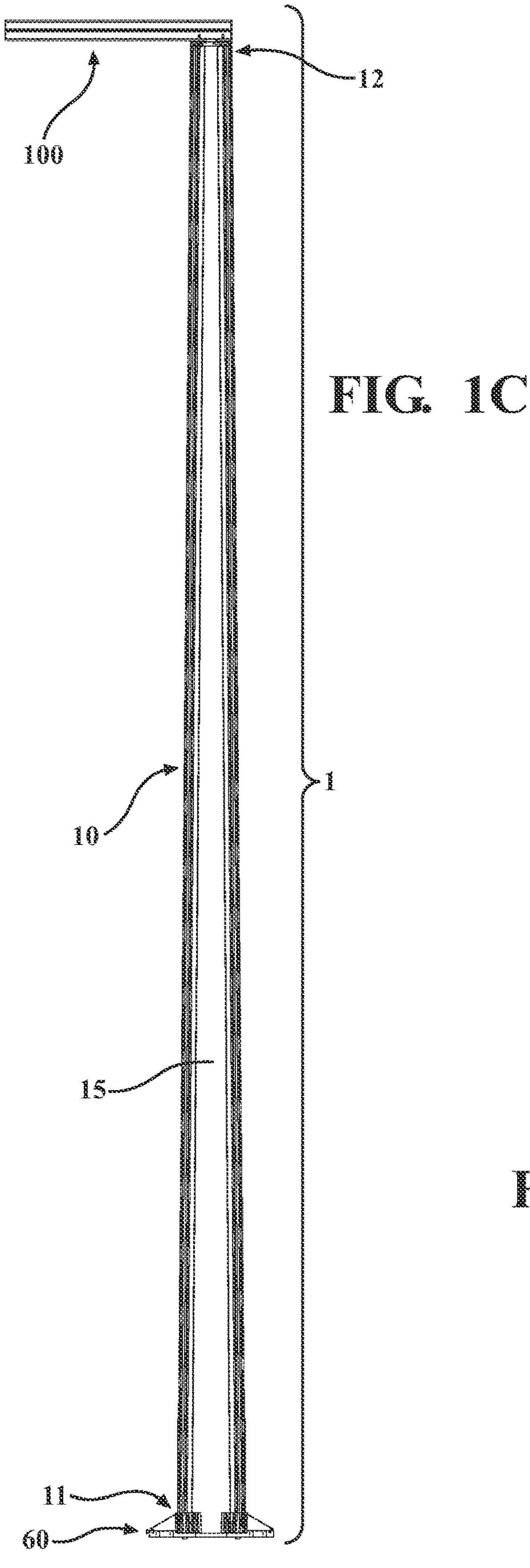
FIG. 1C is a cross-sectional view of the outdoor lighting assembly of FIG. 1A, taken along the lines 1C-1C as indicated in FIG. 1B.
Figure 1D:
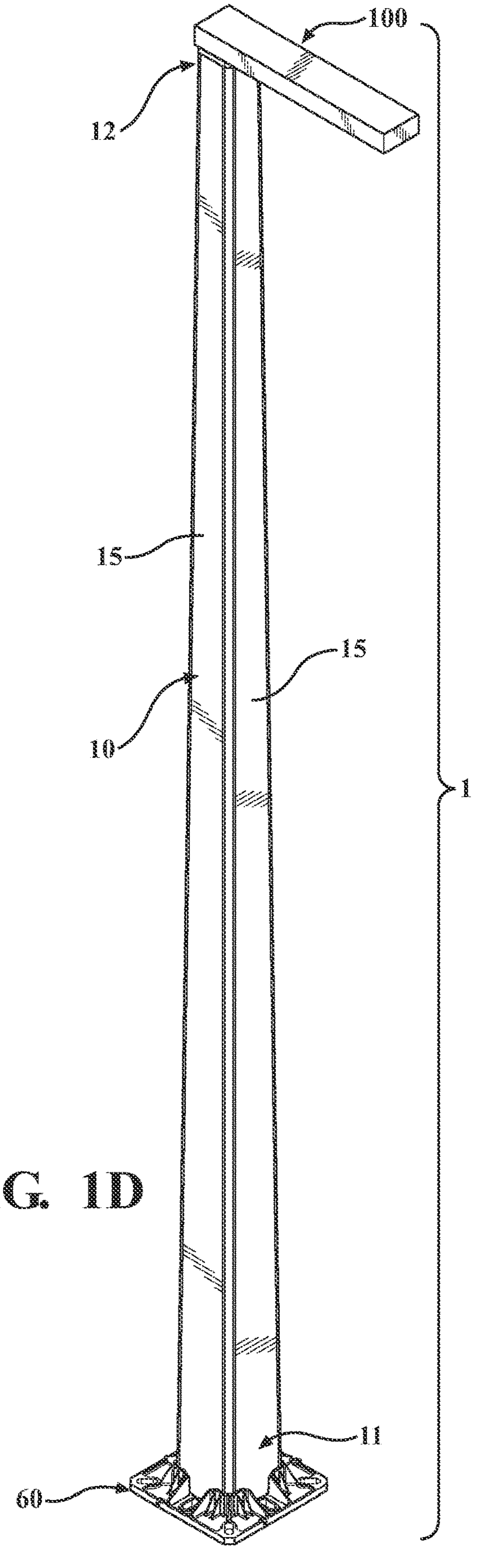
FIG. 1D is a perspective view of the outdoor lighting assembly of FIG. 1A.

Referring now to the drawings, wherein like numerals refer to like or corresponding parts throughout the several views, the present invention comprehends a support pole, such as may be utilized to support a luminaire for an outdoor lighting assembly, as well as, in one embodiment, such an outdoor lighting assembly. The following description is more specifically directed to the embodiment of an outdoor lighting assembly comprising the pole and a luminaire supported thereby, although those skilled in the art will appreciate from this disclosure that the pole may be readily adapted to other uses and need not, therefore, be limited to supporting a luminaire.

As used herein, "luminaire" refers to a light fixture including at least a housing for more or more light sources, and either a source for powering the one or more light sources or means for connecting the one or more light sources to a power source therefor.

Turning first to FIGS. 1A-1D, several views of an outdoor lighting assembly (indicated generally at 1) comprising the support pole 10 and luminaire 100 are shown to provide context for the remainder of this written description and the other drawings. FIG. 1C in particular, which is a cross-sectional view taken along the lines indicated in FIG. 1B, depicts the hollow internal construction of the support pole, which construction is described further below.

Figure 2A:
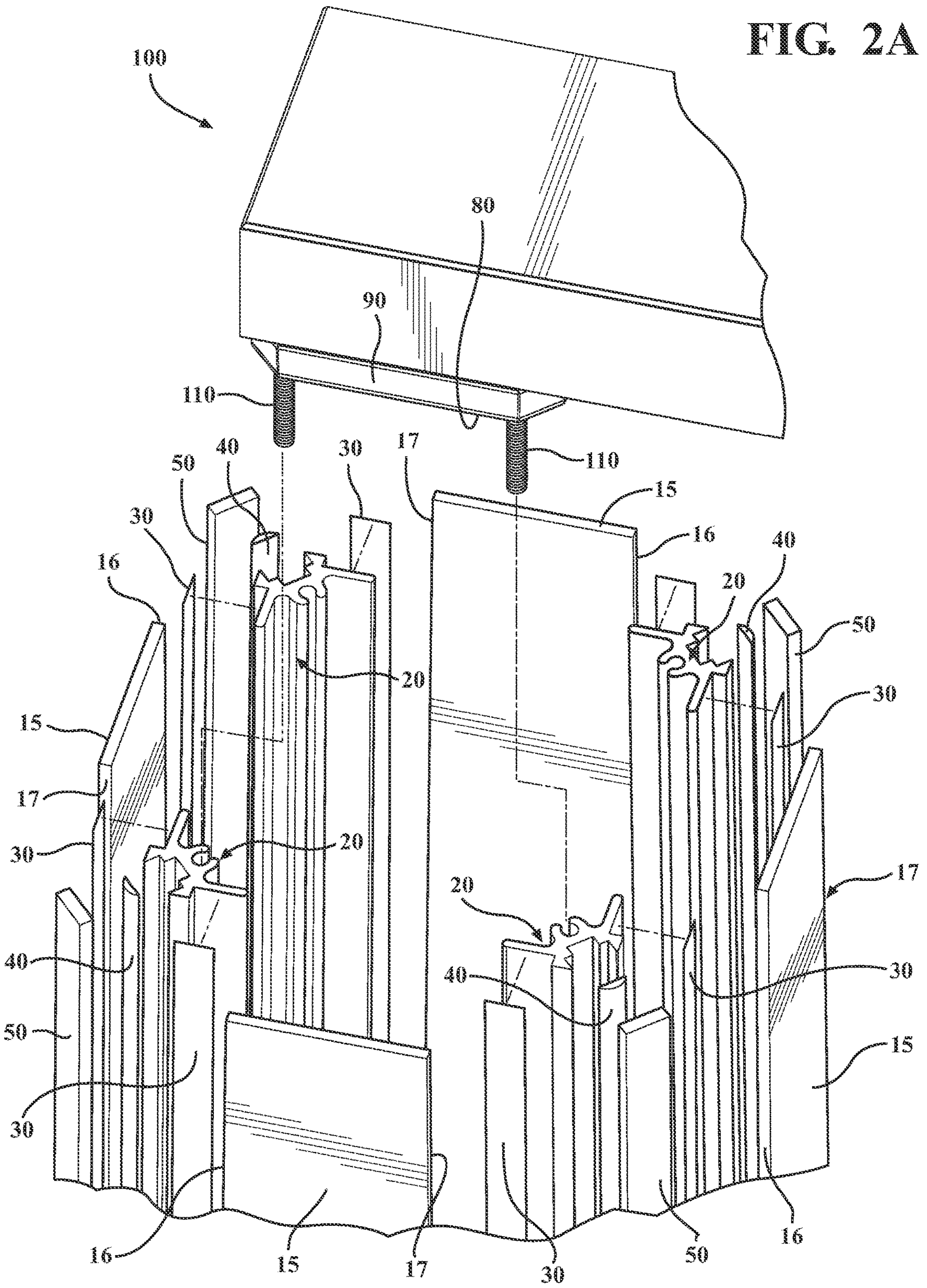
FIG. 2A is a detailed, exploded perspective view of the construction of the support pole.
Figure 2B:
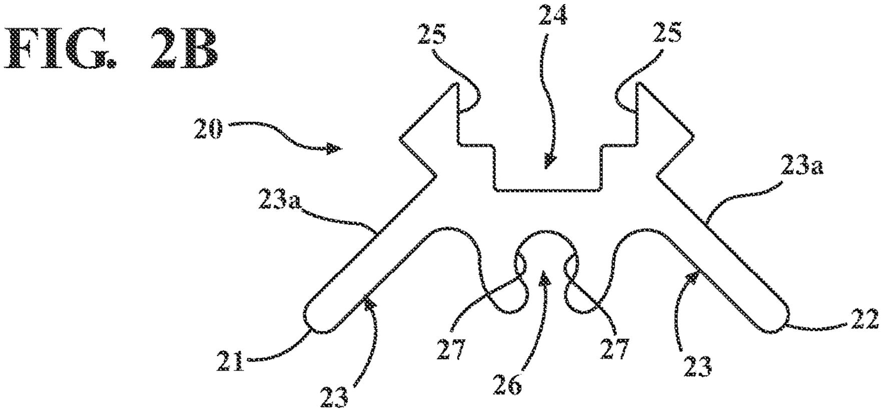
FIG. 2B is an end view of a structural support according to an exemplary embodiment of the present invention.
Figure 3:
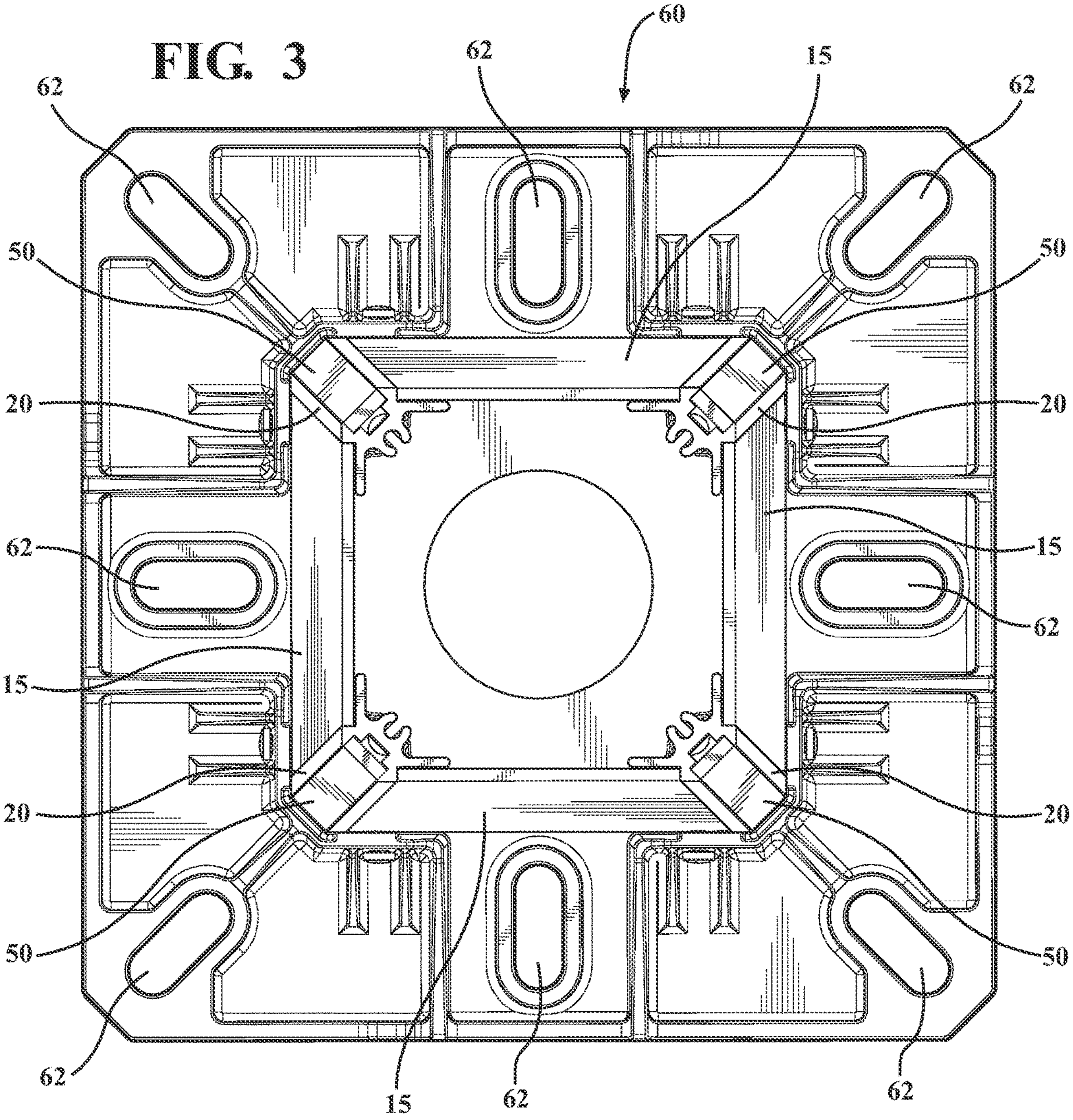
FIG. 3 is a cross-sectional view of the support pole, taken along the lines 3-3 as indicated in FIG. 1A.

Referring also to FIGS. 2A through 3, support pole 10 is a vertically-extending structure extending between lower 11 and upper 12 ends and comprising vertically-extending sidewall panels 15 arranged adjacent to each other to define lateral surfaces of the support pole 10. Each sidewall panel 15 has opposite lateral edges 16, 17 extending between vertically spaced-apart upper and lower ends of said sidewall panels 15. In the illustrated embodiment, these upper and lower ends generally correspond to the upper 12 and lower 11 ends of the support pole 10. A width of each sidewall panel 15 is further defined between lateral edges 16, 17.

Each sidewall panel 15 may be a metal sheet and may be provided with a decorative exterior surface. For instance, each sidewall panel 15 may be printed with a simulated wood grain appearance. Of course, it will be appreciated that a decorative exterior surface, if optionally employed, may be of an appearance according to user desire and may be provided by any conventional means.

In the illustrated embodiment, each sidewall panel 15 is a sheet of aluminum. A sheet thickness of 5 mm has been demonstrated to be satisfactory in the outdoor lighting assembly of this disclosure, although such dimensions and/or material are not intended to be limiting of other dimensions and/or materials that may be employed.

The support pole 10 further comprises a plurality of rigid, vertically-extending structural supports 20, as best shown in FIGS. 2A through 3. Each of the structural supports 20 is disposed between, and interconnects, adjacent sidewall panels 15.

Structural supports 20 are vertically coextensive with sidewall panels 15, extending between upper and lower ends of the support pole. Each of the structural supports 20 has opposite lateral edges 21, 22, and each of the structural supports 20 has a width that is less than the width of each sidewall panel 15.

In the illustrated embodiment, the support pole 10 comprises four such sidewall panels 15 and four structural supports 20. As shown best in FIG. 3, this construction gives support pole 10 a quadrilateral shape in cross-section. However, other constructions are also within the scope of the present invention, including constructions of three sidewall panels 15 or more than four sidewall panels 15.

Referring specifically to FIGS. 2A through 3, sidewall panels 15 overlap the structural supports 20 proximate the respective lateral edges 16, 17, 21, 22 thereof. These overlapping portions of the sidewall panels 15 and structural supports 20 are secured together only with adhesive.

The adhesive may be a double-sided adhesive tape 30 and, more particularly, an acrylic foam tape comprised of an acrylic foam core supporting an acrylic adhesive on opposite surfaces of the core. In the exemplary embodiment, the acrylic foam tape is characterized by a thickness of approximately 0.6 mm. The acrylic foam tape of the exemplary embodiment is characterized by good adhesion to metal surfaces (37N/25 mm according to Chinese National Standard for measuring the peel adhesion properties of adhesive tapes GB/T 2792-2014), good holding power (24H according to Chinese National Standard for measuring the static shear adhesion of adhesive tapes GB/T 4851-2014), and high temperature resistance. Double-sided acrylic adhesive tapes of the kind suitable to the present invention are commercially available, including, for instance, from 3M COMPANY (St. Paul, Minnesota). Those commercially available adhesive tapes designated for outdoor applications are especially well suited to the present invention.

The adhesive comprehended by the present invention may also be a glue of comparable strength to the double-sided tapes as described above.

Per the illustrated embodiment, double-sided adhesive tape is applied to all or substantially all of the vertical length of each structural support in the area proximate edges 21, 22 where sidewall panels 15 overlap in the assembled condition of the support pole.

Figure 4:
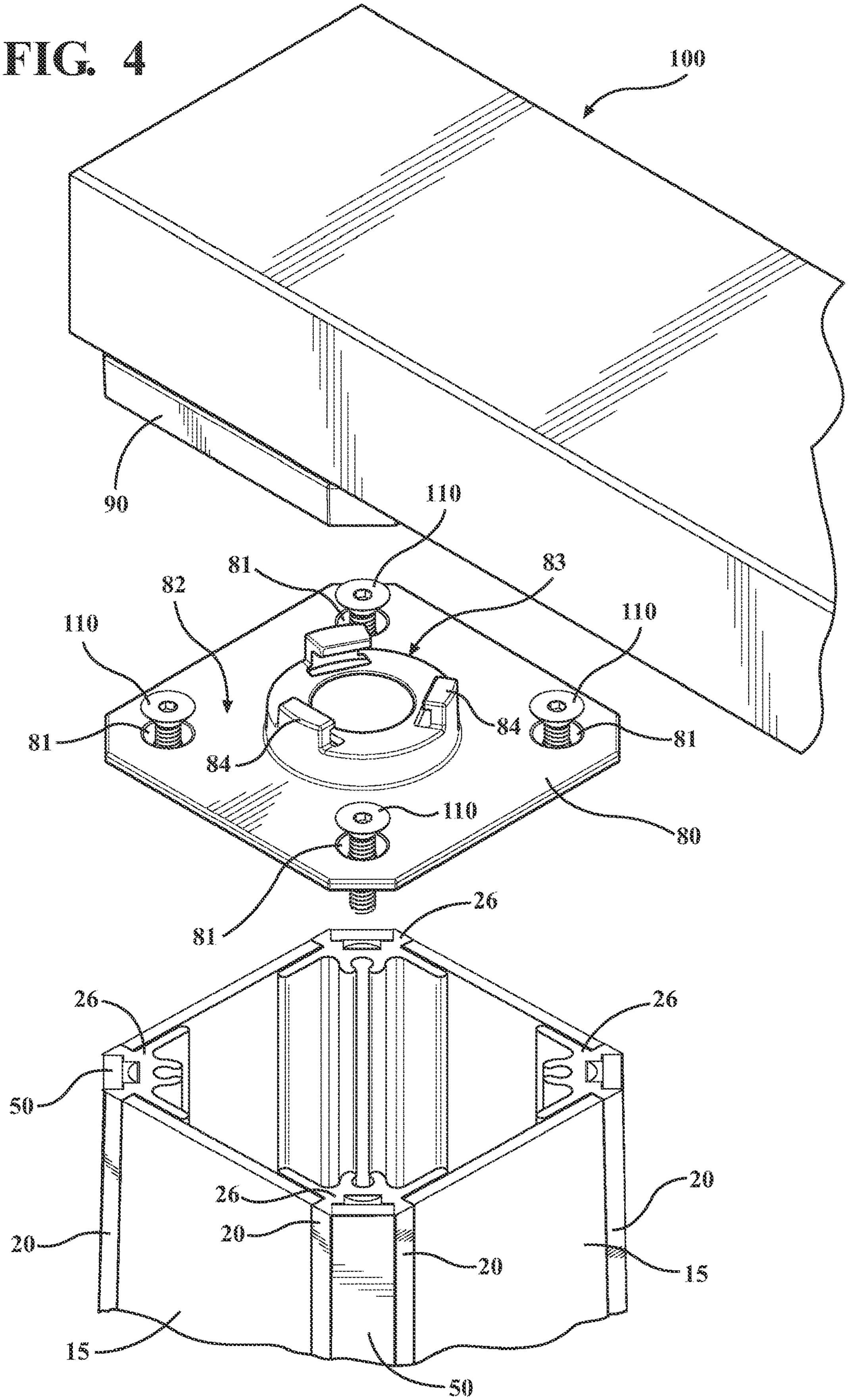
FIG. 4 is a detailed, overhead perspective view of a portion of the luminaire and upper end of the support pole.

As best shown in FIGS. 2-4, each structural support 20 is, in the illustrated embodiment, a corner extrusion having laterally-extending wings 23 defining the surfaces 23*a* that overlap, and provide the point of securement to, portions of the sidewall panels 15. Edges 21, 22 are defined at the outward extremities of wings 23. Adhesive, such as the aforedescribed double-sided adhesive tape, is applied to the surfaces 23*a*.

It will be appreciated that the relative angle of the wings 23 of each structural support 20 define, in combination with the number of such supports 20 and sidewalls 15, the cross-sectional shape of the support pole 10.

Each of the illustrated structural supports 20 further includes a vertically-extending, exteriorly-facing channel 24 defined between walls 25, and an interiorly-facing channel 26 defined between walls 27. As best shown in FIGS. 2A, 3 and 4, exteriorly-facing channel 24 is disposed between adjacent sidewall panels 15 in the assembled support pole 10, thereby defining corners of the support pole 10. Interiorly-facing channel 26 is semi-circular in cross-section and dimensioned to receive threaded fasteners therein, as explained further below.

Per the illustrated embodiment, the foregoing construction characterizes the entire vertical length (i.e., between the upper and lower ends) of each structural support 20. In other words, a transverse cross-section of the structural support 20 wherever taken along its length will have generally the same geometry. However, it will also be understood that, as per the exemplary embodiment, the support pole 10 may optionally taper in dimensions in the vertical direction, such that the width of the support pole is greater toward the lower end and narrower toward the upper end. This is best seen in FIGS. 1A-1D and 3.

Structural supports 20 may be made from any suitable material. In the illustrated embodiment each structural support 20 is an aluminum extrusion.

Optionally, and as shown in the illustrated embodiment, an LED lighting strip 40 is disposed in the exteriorly-facing channel 24 of one or more of the structural supports 20 and is selectively operable to generate illumination that is visible from an exterior of the support pole 10. The LED lighting strip 40 may be coextensive with the length of the channel 24 so as to provide illumination along the vertical length of the support pole 10. It may also be of shorter dimensions or even comprised of a plurality of discrete LED lighting strips arranged in spaced apart fashion along the length of the channel 24. A polymer cover 50 overlies the LED lighting strip 40, being secured to the channel walls 25 by adhesive, for instance. The polymer cover 50 may be transparent or, alternatively, may have light-transmissive exterior surface decoration through which the illumination selectively generated by the LED lighting strip 40 is visible from the exterior of the support pole 10. By way of example and not limitation, such decorative surface decoration could be a printed with a simulated wood-grain appearance to match or compliment a decorative simulated wood-grain appearance applied to the sidewall panels 15. Power for each LED lighting strip may be provided in any conventional manner.

Of course, the LED lighting strips as described need not be employed at all, depending on user preference.

Figure 6:
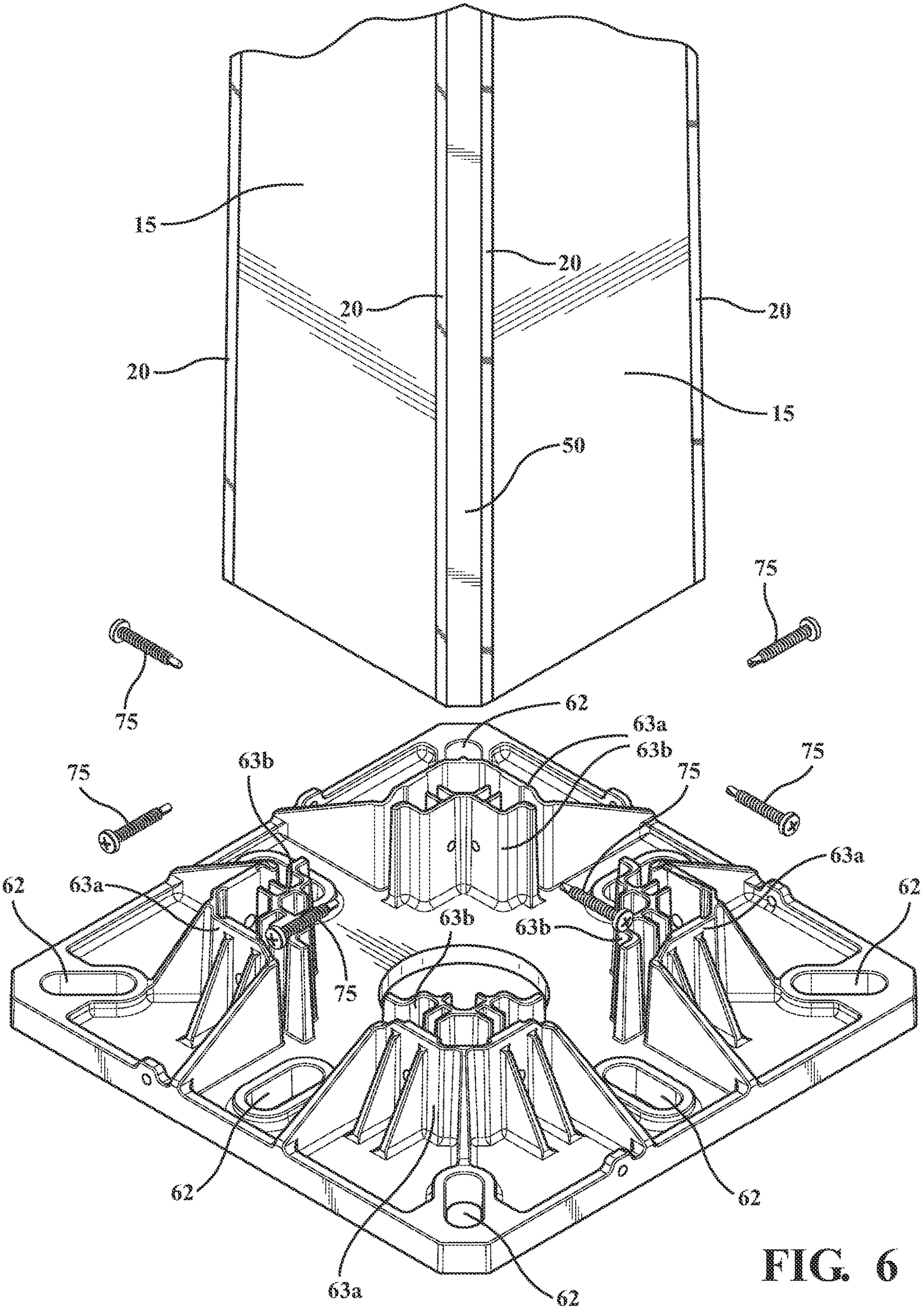
FIG. 6 is a detailed, exploded perspective view of the base and bottom of the support pole, the view being taken from above the base.
Figure 7:
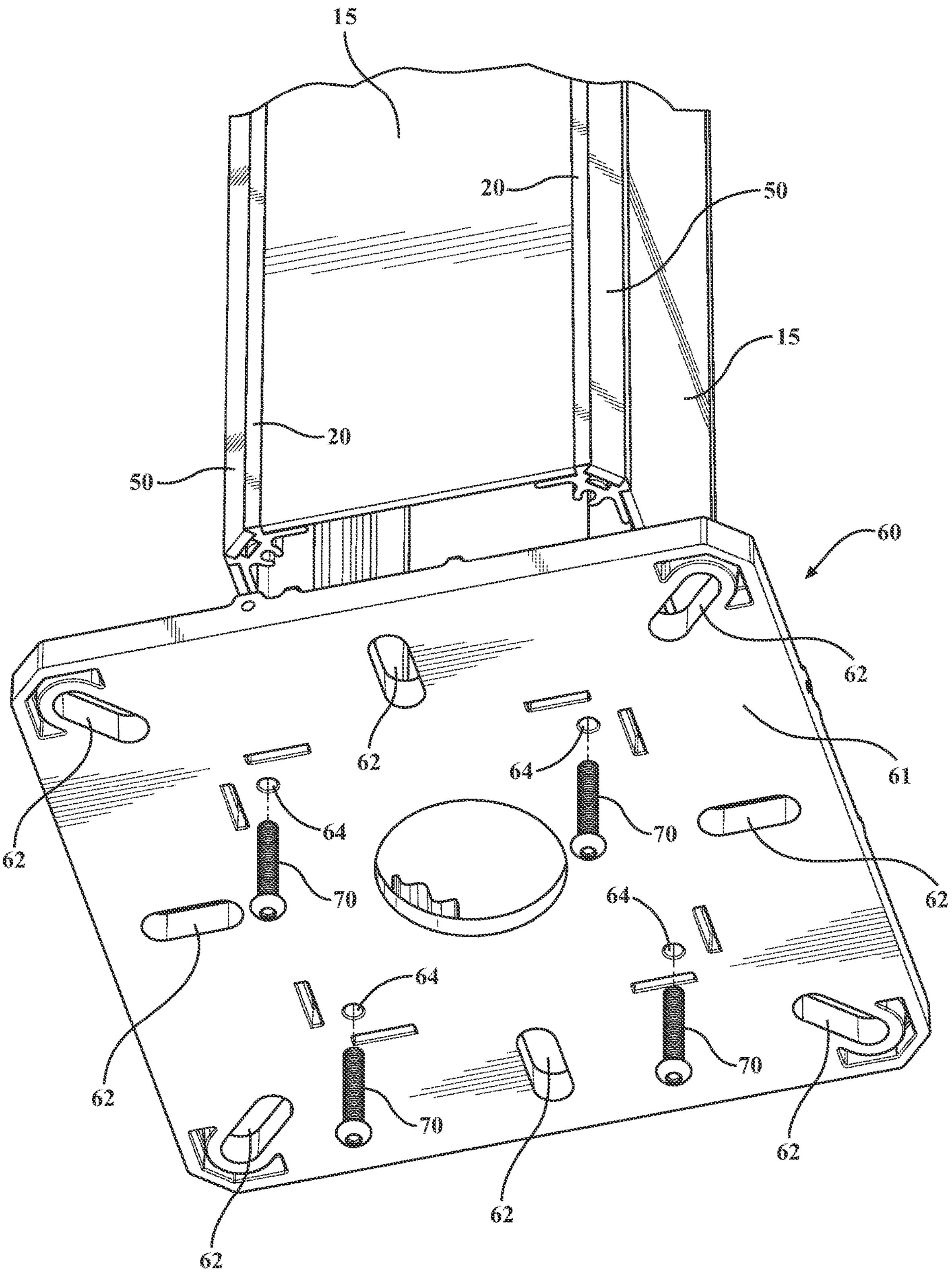
FIG. 7 is a detailed, exploded perspective view of the base and bottom of the support pole, the view being taken from below the base.

Referring to FIGS. 1A-1D and FIGS. 6-8, the support pole 10 includes a base 60 fixedly connected to the support pole 10 at a lower end thereof. Base 60, which may be fashioned from metal or other suitable material, includes a generally flat or planar bottom surface 61 (FIG. 7). A plurality of openings 62 defined through base 60 are adapted to receive fasteners (such as concrete anchors, etc.) for securing base 60 to a suitable support surface (e.g., a concrete slab). A top surface of the base, defined oppositely of the bottom surface 61, has a plurality of upstanding, opposing brackets 63*a*, 63*b* defining channels adapted to receive the lower ends of support structures 20 and portions of the sidewall panels 15.

Figure 8:
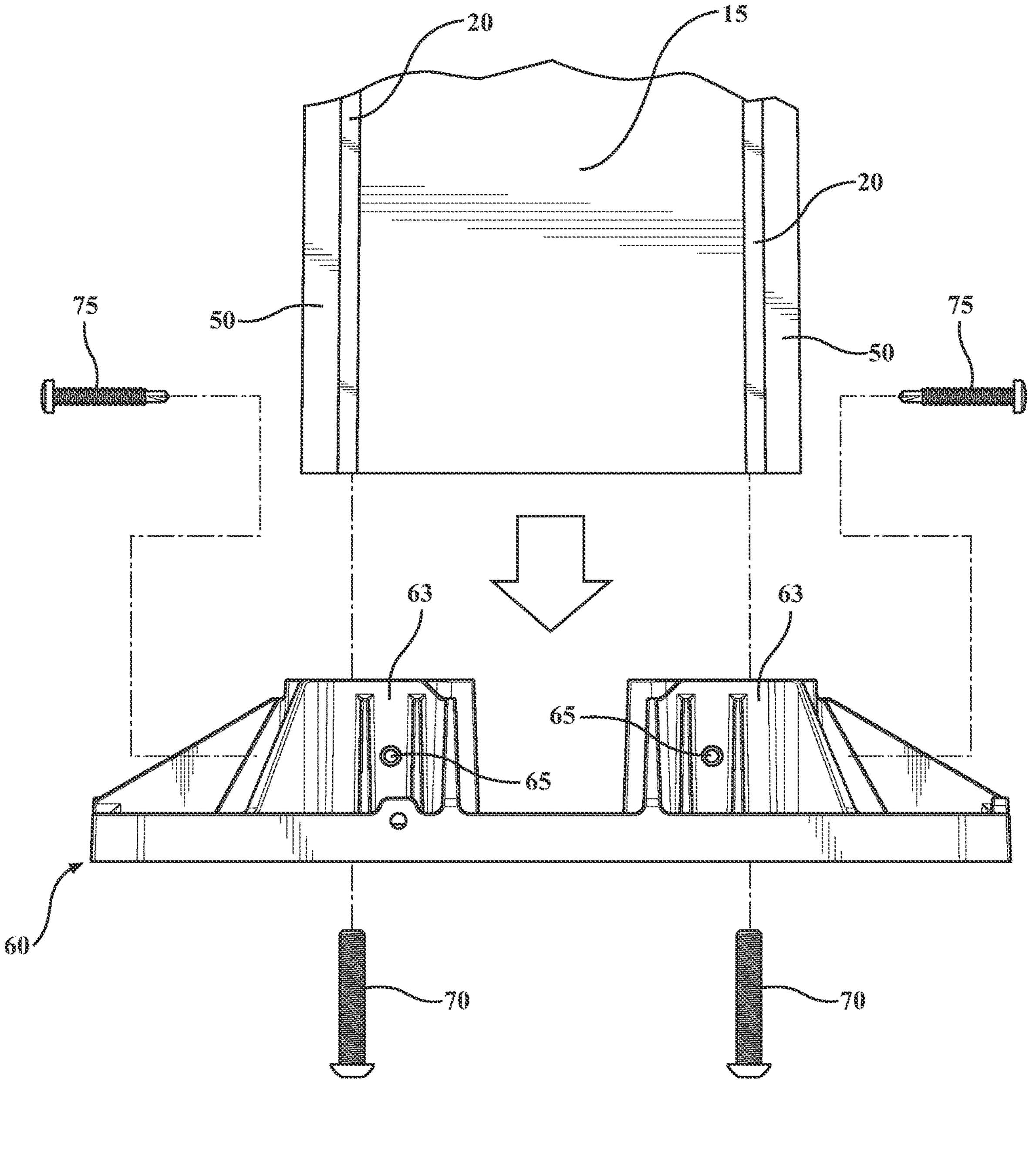
FIG. 8 is a lateral, exploded view of the base and bottom of the support pole.

Openings 64 through the base 60 permit fasteners (such as screws 70) to be inserted from the bottom surface 61 into the interiorly-facing channels 26 to securely fasten structural supports 20 to the base 60. This is best shown in FIGS. 7 and 8. Lateral openings 65 provided through the brackets 63*a*, 63*b*, as shown in FIGS. 6 and 8, receive fasteners 75 (such as self-tapping metal screws, for instance) which extend into the support pole (after it is seated on the base) to further securely fasten the base 60 and support pole 10.

Figure 5:
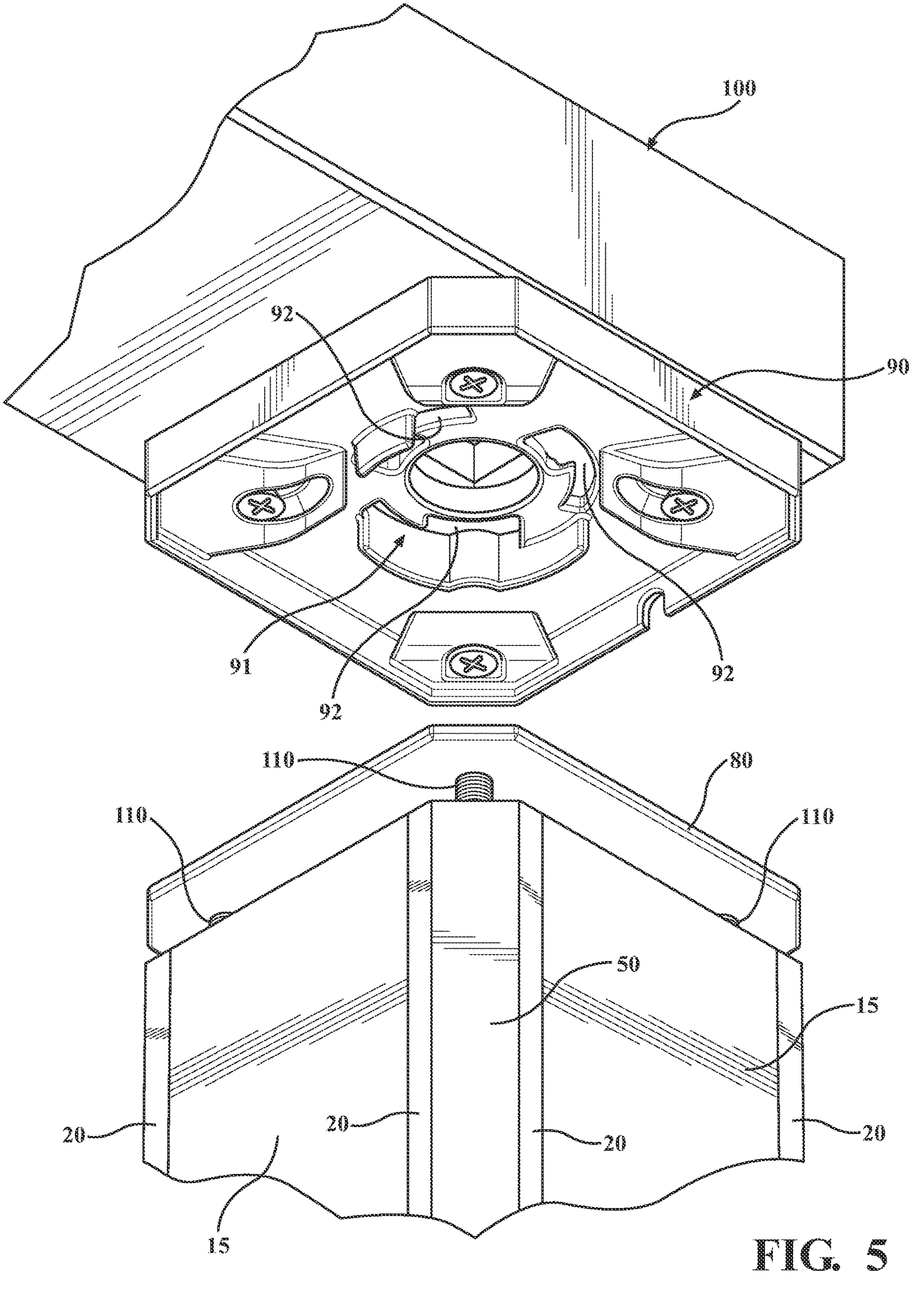
FIG. 5 is a detailed, underside perspective view of a portion of the luminaire and upper end of the support pole.

Turning next to FIGS. 4 and 5, securement of the luminaire 100 to the support pole will be further explained. More specifically, there is shown an anchor plate 80 which corresponds in dimensions to the cross-sectional shape of the support pole 10. Anchor plate 80 may be made of metal or any other suitable material. A plurality of openings 81 are provided through the anchor plate 80. Each opening 81 is aligned with one of the interiorly-facing channels 26 and is dimensioned to receive therethrough a fastener 110 (such as the illustrated screws) which extends into the interiorly-facing channel 26 so as to securely fasten each structural support 20 to the anchor plate 80.

Upper surface 82 of anchor plate 80 includes a centrally-located mount 83 for receiving a complimentarily-shaped opening 91 provided in a mounting base 90 secured to the luminaire 100. In the illustrated embodiment, the mount 83 and opening 91 define corresponding halves of a bayonet-style, quarter-turn mount. Upon receipt of mount 83 within opening 91, the entire luminaire 100 is rotated 90 degrees to effect engagement of tabs or flanges 84 provided in one of the mount 83 or opening 91 with corresponding slots 92 in the other of the mount 73 or opening 91. Of course, it is contemplated that any other conventional means may be employed to secure the luminaire 100 to support pole 10 in an outdoor lighting assembly according to the present invention.

In an outdoor lighting assembly according to the present invention it is to be understood that any suitable power source may be employed. That is, the luminaire and LED lights may be battery and/or solar powered or may be connected to an external power source in any conventional manner. For example and without limitation, an external power source may be provided which is connected to the lighting assembly via wiring that extends upwardly through the base 90 and the interior of the support pole 10, similar to the manner in which conventional outdoor lighting assemblies are powered.

In practice, an outdoor lighting assembly of the aforedescribed construction, in vertical heights as great as 20 feet, has demonstrated better wind-loading strength than comparable-sized round support poles of conventional construction, this despite the fact that the support pole of the present invention is characterized by a construction which is largely limited to the employment of adhesive as particularized herein.

It is to be understood that the disclosed embodiments exemplify how to make and use the invention, but are intended to enable rather than limit the invention. Variations and modifications of the illustrated examples in the foregoing written specification and drawings may be possible without departing from the scope of the invention.

It should further be understood that to the extent the term "invention" is used in the written specification, it is not to be construed as a limiting term as to the number of claimed or disclosed inventions or discoveries, or to the scope of any such invention or discovery, but instead as a term which has long been used to describe new and useful improvements in science and the useful arts. The scope of the invention supported by the above disclosure should accordingly be construed within the scope of what it teaches and suggests to those skilled in the art, and within the scope of any claims that the above disclosure supports.

The claims are representative of the invention and are not intended to limit the claimed invention with respect to other features which are supported by or might become apparent from the description, and which might be claimed subsequently.

The invention in which an exclusive property or privilege is claimed is defined as follows:

1. A vertically-extending support pole, comprising:

three or more vertically-extending sidewall panels arranged adjacent to each other to define external lateral surfaces of the support pole, each sidewall panel having a width and opposite lateral edges extending between vertically spaced-apart upper and lower ends of said sidewall panels;

a plurality of rigid, vertically-extending structural supports, each of said structural supports having a width that is less than the width of each of the three or more sidewall panels, and each of said structural supports having opposite lateral edges extending between vertically spaced-apart upper and lower ends of said structural supports;

wherein each of said structural supports is disposed between, and interconnects, two of said three or more sidewall panels, and wherein further the sidewall panels overlap the structural supports proximate at least the respective lateral edges thereof, with the overlapping portions of the sidewall panels and structural supports being secured together only with adhesive;

wherein one or more of the supports is a corner extrusion having a vertically-extending, exteriorly-facing channel;

wherein a LED lighting strip is disposed in the exteriorly-facing channel of at least one of said one or more corner extrusions, said LED lighting strip selectively operable to generate illumination that is visible from an exterior of said support pole; and wherein a cover overlies each LED lighting strip.

2. The support pole of claim 1, wherein the adhesive is a double-sided adhesive tape.

3. The support pole of claim 1, comprising four sidewall panels and four supports, and wherein further the support pole is characterized by a quadrilateral shape in cross-section.

4. The support pole of claim 1, wherein each sidewall panel is a metal sheet.

5. The support pole of claim 4, wherein each sidewall panel has a decorative exterior surface.

6. The support pole of claim 1, wherein said polymer cover has a decorative exterior surface through which the illumination selectively generated by said LED strip is visible from the exterior of said support pole.

7. The support pole of claim 1, further comprising a luminaire secured to said support pole at an upper end thereof.

8. The support pole of claim 7, further comprising a luminaire anchor plate fixedly connected to the one or more of said structural supports at the upper end of said support pole, wherein said luminaire is connected to the support pole via said luminaire anchor plate.

9. The support of claim 1, further comprising a base fixedly connected to said support pole at a lower end thereof.

10. The support pole of claim 9, wherein said base is fixedly connected to the lower end of one or more of said structural supports.

11. An outdoor lighting assembly, comprising:

a vertically-extending support pole having three or more vertically-extending sidewall panels arranged adjacent to each other to define external lateral surfaces of the support pole, each sidewall panel having a width and opposite lateral edges extending between vertically spaced-apart upper and lower ends of said sidewall panels;

a plurality of rigid, vertically-extending structural supports, each of said structural supports having a width that is less than the width of each of the three or more sidewall panels, and each of said structural supports having opposite lateral edges extending between vertically spaced-apart upper and lower ends of said structural supports;

wherein each of said structural supports is disposed between, and interconnects, two of said three or more sidewall panels, and wherein further the sidewall panels overlap the structural supports proximate at least the respective lateral edges thereof, with the overlapping portions of the sidewall panels and structural supports being secured together only with adhesive;

a luminaire secured to said support pole at an upper end thereof;

wherein one or more of the supports is a corner extrusion having a vertically-extending, exteriorly-facing channel; and wherein a LED lighting strip is disposed in the exteriorly-facing channel of at least one of said one or more corner extrusions, said LED lighting strip selectively operable to generate illumination that is visible from an exterior of said support pole.

12. The outdoor lighting assembly of claim 11, wherein the adhesive is a double-sided adhesive tape.

13. The outdoor lighting assembly of claim 11, wherein the support pole comprises four sidewall panels and four structural supports, and wherein further the support pole is characterized by a quadrilateral shape in cross-section.

14. The outdoor lighting assembly of claim 11, wherein each sidewall panel is a metal sheet.

15. The outdoor lighting assembly of claim 14, wherein each sidewall panel has a decorative exterior surface.

16. The outdoor lighting assembly of claim 11, wherein a polymer cover overlies each LED lighting strip.

17. The outdoor lighting assembly of claim 16, wherein said cover has a decorative exterior surface through which the illumination selectively generated by said LED strip is visible from the exterior of said support pole.

18. The outdoor lighting assembly of claim 11, further comprising a luminaire anchor plate fixedly connected to the one or more of said structural supports at the upper end of said support pole, wherein said luminaire is connected to the support pole via said luminaire anchor plate.

19. The outdoor lighting assembly of claim 11, further comprising a base fixedly connected to said support pole at a lower end thereof.

20. The outdoor lighting assembly of claim 19, wherein said base is fixedly connected to the lower end of one or more of said structural supports.

21. A vertically-extending support pole, comprising:

three or more vertically-extending sidewall panels arranged adjacent to each other to define external lateral surfaces of the support pole, each sidewall panel having a width and opposite lateral edges extending between vertically spaced-apart upper and lower ends of said sidewall panels;

a plurality of rigid, vertically-extending structural supports, each of said structural supports having a width that is less than the width of each of the three or more sidewall panels, and each of said structural supports having opposite lateral edges extending between vertically spaced-apart upper and lower ends of said structural supports;

wherein each of said structural supports is disposed between, and interconnects, two of said three or more sidewall panels, and wherein further the sidewall panels overlap the structural supports proximate at least the respective lateral edges thereof, with the overlapping portions of the sidewall panels and structural supports being secured together only with adhesive;

wherein each support is a corner extrusion having laterally-extending wings and a vertically-extending, exteriorly-facing channel disposed between said wings;

wherein a LED lighting strip is disposed in the exteriorly-facing channel of at least one of said corner extrusions, said LED lighting strip selectively operable to generate illumination that is visible from an exterior of said support pole;

wherein a polymer cover overlies each LED lighting strip.

22. The support pole of claim 21, wherein said polymer cover has a decorative exterior surface through which the illumination selectively generated by said LED strip is visible from the exterior of said support pole.

23. An outdoor lighting assembly, comprising:

a vertically-extending support pole having three or more vertically-extending sidewall panels arranged adjacent to each other to define external lateral surfaces of the support pole, each sidewall panel having a width and opposite lateral edges extending between vertically spaced-apart upper and lower ends of said sidewall panels;

a plurality of rigid, vertically-extending structural supports, each of said structural supports having a width that is less than the width of each of the three or more sidewall panels, and each of said structural supports having opposite lateral edges extending between vertically spaced-apart upper and lower ends of said structural supports;

wherein each of said structural supports is disposed between, and interconnects, two of said three or more sidewall panels, and wherein further the sidewall panels overlap the structural supports proximate at least the respective lateral edges thereof, with the overlapping portions of the sidewall panels and structural supports being secured together only with adhesive; and a luminaire secured to said support pole at an upper end thereof;

wherein each structural support is a corner extrusion having laterally-extending wings and a vertically-extending, exteriorly-facing channel disposed between said wings;

wherein a LED lighting strip is disposed in the exteriorly-facing channel of at least one of said corner extrusions, said LED lighting strip selectively operable to generate illumination that is visible from an exterior of said support pole.

24. The support pole of claim 23, wherein a polymer cover overlies each LED lighting strip.

25. The support pole of claim 24, wherein said polymer cover has a decorative exterior surface through which the illumination selectively generated by said LED strip is visible from the exterior of said support pole.

* * * * *